United States Patent [19]

Coffman

[11] Patent Number: 5,316,422
[45] Date of Patent: May 31, 1994

[54] BLIND FASTENER

[75] Inventor: Ron D. Coffman, Valley Center, Calif.

[73] Assignee: Qualcomm Incorporated, San Diego, Calif.

[21] Appl. No.: 891,020

[22] Filed: Jun. 1, 1992

[51] Int. Cl.⁵ .................. F16B 13/04; F16B 37/04; F16B 39/00
[52] U.S. Cl. .................................. 411/107; 411/16; 411/182; 411/339; 411/340
[58] Field of Search ............... 411/16, 17, 107, 173, 411/177, 178, 182, 340, 341, 342, 350, 339, 338

[56] References Cited

U.S. PATENT DOCUMENTS

| 2,201,930 | 5/1940 | Stark | 411/16 X |
| 2,576,003 | 11/1951 | Dry | 411/347 X |
| 3,531,142 | 9/1970 | Peasley | 411/178 X |
| 4,573,844 | 3/1986 | Smith | 411/340 |
| 4,812,097 | 3/1989 | Moulton | 411/350 X |
| 4,859,127 | 8/1989 | Koch | 411/16 |
| 4,886,405 | 12/1989 | Blomberg | 411/16 |

Primary Examiner—Neill R. Wilson
Attorney, Agent, or Firm—Russell B. Miller; Sean English

[57] ABSTRACT

A fastener which enables the attachment of an article to a panel having front and rear surfaces and an aperture formed therebetween, particularly in cases where access to the panel is limited to one side only. The fastener includes a stud having a head and a shank, a spring mounted upon said stud, and a washer having a through hole. The shank further includes a first retaining portion for securely engaging the washer within said through hole and a second retaining potion for engaging an article for securement thereto.

14 Claims, 10 Drawing Sheets

BLIND FASTENER

BACKGROUND OF THE INVENTION

I. Field of the Invention

The present invention relates to mounting devices. More particularly, the present invention relates to a novel and improved removable mechanical fastener for mounting to an article which permits another article to be securely mounted thereto.

II. Description of the Related Art

Various types of hardware have been developed for securing articles to another article. Generally where access is available to both sides of a pane or wall the hardware choice is quite extensive. However where access is available to one side of the panel or wall, the selection of mounting hardware becomes limited. For these applications the panel mounting hardware is generally limited to screws, lag bolts, expandable anchoring inserts, and spring loaded wing bolts. Each one of these mounting hardware types has advantages and disadvantages in application.

In many applications where single side available panel mounting hardware can be used, it is preferable that support for the anchor be provided by more than the through hole such as is the case of for screws, lag bolts and inserts. Such additional support can be provided by the spring loaded wing bolt assembly. However where a threaded insert is necessary the spring loaded wing bolt is generally not preferred since the bolt is needed to support the placement of the wing nut behind the panel. In many cases it is desirable to distribute the load supported by the fastener over a larger surface area on the rear surface of the panel than is provided by conventional fasteners.

On occasion it is desirable to remove the stud or insert hardware. Several of the existing hardware types have their drawbacks in easily permitting such action. For example, in removing inserts it may be lost on the unavailable side of the panel. Similar is the case for the spring loaded wing bolt where the wing nut is typically lost on the unavailable side of the panel when the bolt is removed.

It is therefore an object of the present invention to provide a novel and improved form of panel mounting hardware which provides maximum support contact to the mounting panel.

It is yet another object of the present invention to provide panel mounting hardware which may be removable without loss of the hardware.

SUMMARY OF THE INVENTION

The present invention is a novel and improved fastener for mounting in a panel for coupling of an article thereto. The fastener of the present invention thus enables the attachment of an article to a panel having front and rear surfaces and an aperture formed therebetween, and in which access to the panel may be limited to one side only. In an exemplary implementation the fastener of the present invention includes a stud having a head and a shank, a spring mounted upon said stud, and a washer having a through hole. The shank further includes a first retaining portion for securely engaging the washer within said through hole and a second retaining potion for engaging an article for securement thereto. In various implementations of the fastener of the present invention it may be readily removed for reuse. Each implementation provides of the fastener additional support to the rear surface of the panel than is provided is conventional comparable fasteners.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figures 1, 2, 3:
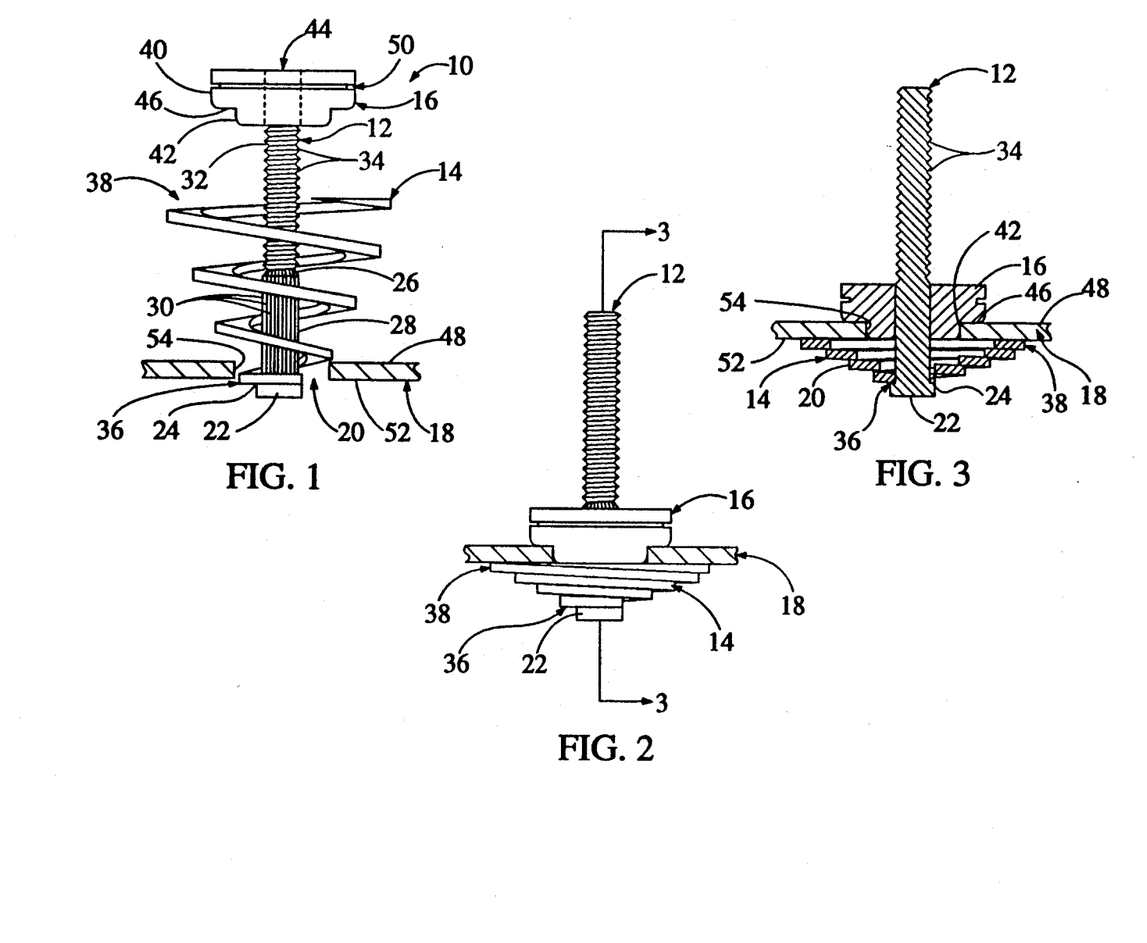
FIG. 1 is a side elevation view of one exemplary embodiment of the fastener of the present invention.
FIG. 2 is a side elevation view of the fastener of FIG. 1 in the installed position.
FIG. 3 is a sectional view of the installed fastener of FIG. 2 taken across line 3—3 of FIG. 2.

Referring now to the drawings, FIG. 1 illustrates a first exemplary embodiment of the fastener 10 of the present invention. Fastener 10 is comprised of a mounting means or stud 12, first retaining means or spring 14, and second retaining means or shoulder washer 16. Fastener 10 as illustrated in FIG. 1 is positioned for mounting upon panel 18 at hole 20 therein. In FIG. 1, panel 18 is shown in cross section at hole 20 for purposes of ease in understanding of the invention.

Stud 12 is comprised of head 22 at one end and shank 26 extending therefrom with shoulder 24 formed where head 22 meets shank 26. Head 22 may be of various shapes, such as circular, hex or octagonal, and of various sizes but is smaller in diameter than hole 20. Head 22 is larger in diameter than adjacently formed shank 26. Shank 26 is formed with a fastener securing means or spline portion 28 in a region adjacent to head 22. Spline portion 28 is defined by a plurality of longitudinal self-cutting force fit splines 30 formed around shank 26. Splines 30 serve as a securing means for securing washer 16 upon stud 12 when fastener 10 is installed. Adjacent to spline portion 28 is an article mounting means or threaded portion 32, which extends therefrom to the other end of shank 26, which includes threads 34. Threaded portion 32 is generally slightly smaller in maximum diameter than spline portion 28 so as to permit washer 16 to slip over portion 32 and securely engage portion 28. Threaded portion 32 enables the secure mounting of an article upon stud 12.

Positioned upon stud 12 is spring 14 which is generally in a helical or spiral form. Spring 14 is comprised of a single length of a flexible, yet resilient, material having a substantially rectangular cross-section. Spring 14 is thus formed in helical shape so as to have angled overlapping windings or coils. For example, spring 14 may be formed from flat wound heat treated steel wound with overlapping coils. The opening formed at small end 36 of spring 14 is larger than shank 26 in spline portion 28 and smaller than head 22. Spring 14 is positioned upon stud 12 with the spring small end 36 retained by shoulder 24 of head 22. The remainder of spring 14 spirals outwardly towards stud threaded portion 32 and ends at large end 38. It is preferred that the winding from which spring 14 is formed be at small end 36 an inner diameter which is in contact with splines 30. The contact with splines 30 thus facilitates retention of spring 14 upon stud 12 so that it does not slide off shank 26. Spring 14 is formed with windings of a width such that when the spring is compressed the spring windings overlap one another.

Shoulder washer 16 is generally cylindrical in shape and is comprised of a surface portion 40 and a hole portion 42. Washer 16 is formed with a central axial through hole 44 which is slightly larger in diameter than threaded portion 32, yet small enough in diameter to securely contact splines 30. Hole portion 42 is preferably smaller in outer diameter than surface portion 40 such that shoulder 46 is formed. It is further preferred that hole portion 42 be of an outer diameter slightly smaller than hole 20 so as to permit seating of hole portion 42 within hole 20 with shoulder 46 contacting the front surface 48 of panel 18. It should be understood that washer 16 may be formed without a hole portion so as to have the appearance of a thick flat washer. Washer 16 preferably includes in surface portion 40 an annular groove 50 at an outer side surface which may be used for tool placement in removing washer 16 from stud 12.

In the installation of fastener 10 upon panel 18, head 22 is first inserted into hole 20. Since spring 14 is of a larger outer diameter than hole 20 which would prohibit direct placement into hole 20, the assembly of stud 12 and coupled spring 14 is rotated for insertion through hole 20. The gap between the winding of spring 14 readily permits spring 14 to be inserted through the smaller diameter hole 20. Once the assembly of stud 12 and spring 14 are positioned with spring 14 completely through hole 20 and facing the rear surface 52 of panel 18, washer 16 may be used to secure the stud and spring assembly upon panel 18. Washer 16 is drawn over splines 30 which securely engage inner wall 54 of washer 16. Furthermore spring 14 is compressed into contacting panel rear surface 52 with the windings of spring 14 compressed into contacting one another. Washer 16 is thus seated in hole 20 with hole portion 42 contacting inner wall 54 of hole 20 in panel 18. Washer shoulder 46 contacts the front surface 48 of panel 18 about hole 20.

FIGS. 2 and 3 illustrate fastener 10 as installed in hole 20 upon panel 18, with panel 18 again being shown in cross section at hole 20 for ease in understanding the invention. As illustrated in FIGS. 2 and 3, FIG. 3 being a sectional view taken across line 3—3 of FIG. 2, washer 16 is seated in hole 20 with shoulder 46 contacting front surface 48 of panel 18. Washer hole portion 42 is positioned in a contacting position with hole inner wall 54. Washer 16 thus provides a supporting contact on two surfaces of panel 18. Spring 14 in a compressed position is retained on stud 12 by head 22 with spring large end 38 contacting panel rear surface 52. With spring 14 having angled overlapping windings, when compressed it forms a resilient contacting member against head 22 and panel rear surface 52. When compressed, spring 14 provides contact with rear surface 52 a radial distance away from hole 22 determined by the diameter of spring large end 38. It is believed that by increasing the diameter of spring large end 38 is one of several factors for realizing an increase in the support capabilities of stud 12.

The thickness of panel 18 is a factor in how far washer 16 may be drawn upon spline portion 28. It is desirable that spline portion 28 be of a sufficient length to contact a major portion if not all of washer 16 to adequately secure stud 12 and washer 16 together. The drawing of washer 16 upon spline portion should in all cases be sufficient to secure washer 16 and spring to panel 18. It should be understood that fasteners of various sizes may be constructed for various support requirements. Variations in spring size and construction, along with stud size and construction including head sizes and shapes, shank lengths and proportional lengths of the spline portion and threaded portion. The specific attachment of an article to stud of a panel installed fastener should also not be interfered with by a fastener that has a spline portion of excessive length.

Once fastener 10 is installed in panel 18, various articles may be attached thereto in a conventional manner. One advantage of fastener 10 is that in the installation there is no need to have access to the rear side of panel 18. Fastener 10 provides an improvement in support capabilities over conventional blind fastener since the fastener securely contacts three surfaces of panel 18. Furthermore the removal of fastener 18 from panel is accomplished by merely withdrawing washer 16 form spline portion 30, thereby allowing spring 14 to decompress, and with a rotating withdrawal action removing the stud and spring assembly from hole 20.

Figure 4:
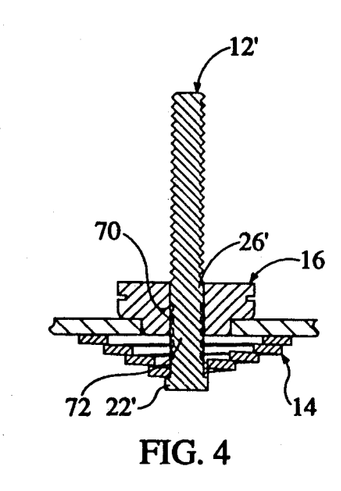
FIG. 4 is a sectional view of another exemplary embodiment of an installed fastener.

FIG. 4 illustrates a slight modification of the means for securing washer 16 and stud 12' wherein the splines of FIGS. 1–3 are replaced by a series of clench rings 70. As illustrated in FIG. 4, shank 26' includes, in replacement of securing means splines 30 in spline portion 28 of shank 26 of FIGS. 1–3, clench ring portion 72 adjacent head 22' where spaced apart clench rings 70 are formed. Clench rings 70 as are well known in the art are annular outwardly protruding rings formed on stud 12' which provide a force fit coupling to washer 16 when drawn over clench ring portion 72 of stud 12'.

Figure 5:
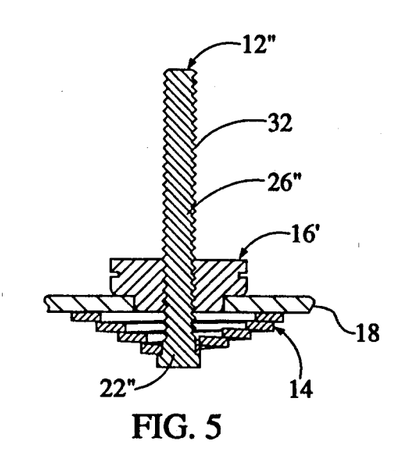
FIG. 5 is a sectional view of another yet exemplary embodiment of an installed fastener.

FIG. 5 illustrates yet another modification of the means for securing washer 16 and stud 12" wherein the splines of FIGS. 1–3 are replaced by a continuation of threads 34. As illustrated in FIG. 4, shank 26" includes, in replacement of securing means splines 30 in spline portion 28 of shank 26 of FIGS. 1–3, a continuation of threaded end portion to adjacent head 22". Washer 16' is similarly match threaded in through hole 44 provide threaded coupling of washer 16' when screwed on stud 12". It should be further understood that there may be an unthreaded region in the threaded end portion 32' midway between the stud head and the opposite end.

Figure 6:
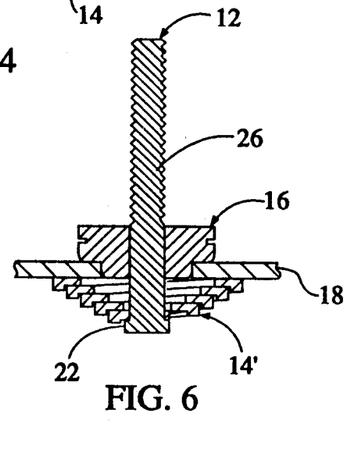
FIG. 6 is a sectional view of a further exemplary embodiment of an installed fastener.
Figure 7:
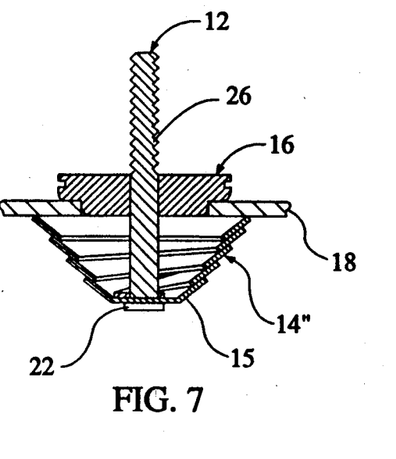
FIG. 7 is a sectional view of still a further exemplary embodiment of an installed fastener.

FIGS. 6 and 7 respectively illustrate exemplary embodiments of the present invention with respect to variations in spring 14. Spring 14' illustrated in FIG. 6 is helical in nature but is of an L-shaped cross section. Spring 14' provides increased resistance to lateral movement due to the interlocking nature of the L-shaped windings. Spring 14" illustrated in FIG. 7 is again helical in nature with the windings also rectangular in cross section. The cross section of the windings of spring 14" are much wider than the thickness so that the overlapping windings provide an exaggerated conical appearance to the spring when compressed. The increase in winding width also serves to provide greater resistance to lateral movement. A frusto-conical shaped retaining washer 15 is mounted upon shank 26 between head 22 and spring 14" to provide additional support of spring 14" upon compression.

Figure 8:
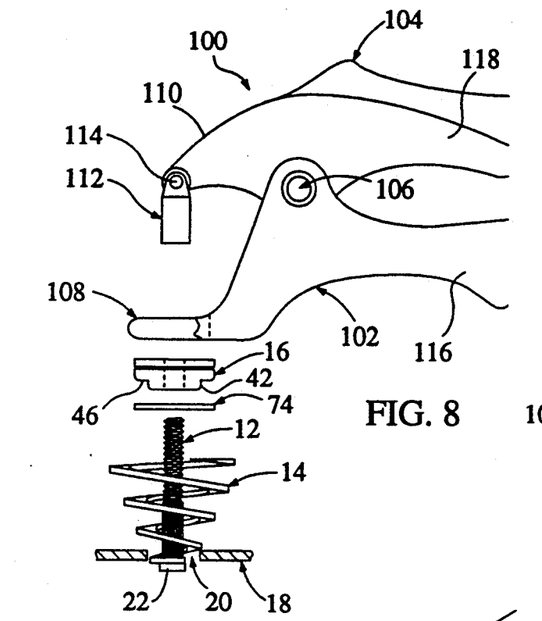
FIG. 8 is a side elevation view of the fastener and installation tool in preparation of installing the fastener to a panel.

FIGS. 8–12 illustrate various stages of installation of fastener 10 of the present invention. In FIG. 8, an installation tool 100 is used for the installation of fastener 10 upon panel 18. Fastener 10 as illustrated in FIG. 8 further includes an optional contact tape type washer 74 for providing a waterproof seal of fastener 10 in hole 20. Washer 74 is positioned on stud 12 between spring 14 and washer 16. Washer 74 preferably has an outer diameter larger than the diameter of hole 20 in panel 18. Washer 74 also includes a central axial through hole of a diameter which allow washer 74 to fit over the hole portion 42 of washer 16 and rest upon shoulder 46 thereof.

Installation tool 100 is comprised of lower handle member 102 and upper handle member 104 pivotally coupled together by pin 106. Lower handle member 102 includes a jaw portion 108 having a bifurcated or two prong fork-shaped end. In the alternative, the end of jaw portion 108 may merely have a through hole formed therein. For purposes of illustration a portion of the end of jaw portion 108 is cut away to illustrate the nature of the forked shape. Upper handle member 104 includes, at jaw portion 110 opposite jaw portion 108, coupling member 112 pivotally coupled by pin 114 near the end thereof. The fork or hole formed at the end of jaw portion 108 should have an opening of a size which permits coupling member 112 to pass therethrough during use of the tool 100. Each of handle members 102 and 104 respectively have gripping portions 116 and 118 extending at pin 106 away from jaw portions 108 and 110.

Figure 9:
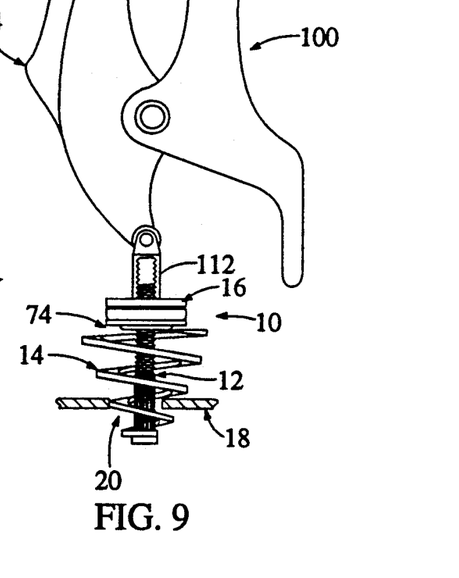
FIG. 9 is a side elevation view of the fastener and installation tool with the fastener partially inserted in the panel.

As illustrated in FIG. 9 fastener 10 is partially inserted in hole 20 using tool 100. Tool 100 is shown with coupling member 112, partially cut away for illustration purposes. Coupling member 112 includes a central axial threaded bore for engaging the threads of stud 12. In the installation of fastener 10, optional washer 74 is first placed over the assembly of stud 12 and spring 14, followed by the placement of washer 16 on stud 12. Coupling member 112 is then screwed upon the threads of stud 12. Tool 100 is rotated, or by other twisting motion, along with fastener 10 so as to insert fastener 10 through hole 20.

Figure 10:
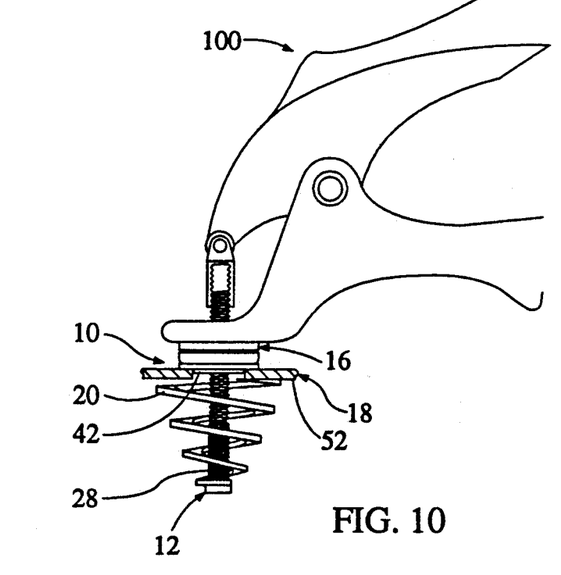
FIG. 10 is a side elevation view of the fastener and installation tool with the fastener fully inserted in the panel.

FIG. 10 illustrates the complete insertion of fastener 10 within hole 20. In this position spring 14 is completely through hole 20 and contacts rear surface 52 of panel 18. Washer 16 may then be positioned so that hole portion 42 is within hole 20.

With the forked end of jaw portion 108 positioned directly over and around washer 16, gripping portions 116 and 118 are squeezed together. This action increases the distance between jaw portions 108 and 110 so as to draw stud 12 through washers 74 and 16. At some point washer 16 also begins to engage spline portion 28 of stud 12 and is drawn further thereupon. The closing of gripping portions 116 and 118 draws head 22 closer to panel 18. This action also causes spring 14 to compress as retained between head 22 and rear surface 52 of panel 18.

Figure 11:
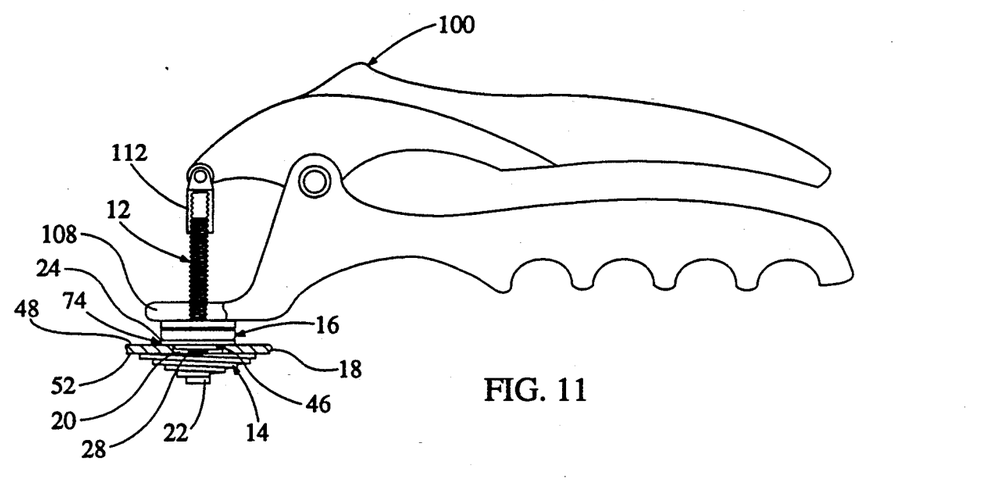
FIG. 11 is a side elevation view of the fastener and installation tool with the fastener installed in the panel.

FIG. 11 illustrates the complete installation of fastener 10 upon panel 18 prior to removal of tool 100. Spring 14 is collapsed with its overlapping coils securely contacting one another and at respective ends to head 22 and rear surface 52 of panel 18. In addition, hole portion 46 of washer 16 is compressed within hole 20 with washer 74 compressed against upper front surface 48 by shoulder 24 of washer 16. Washer 16 is secured upon stud 12 by the engaging action of the splines in the washer through hole. The distance to which washer 16 is drawn upon the spline portion of stud 12 is dependent upon the thickness of panel 18. Tool 100 is then removed from stud 12 by simply unscrewing it.

FIG. 12 again illustrates washer 16 secured upon spline portion 28 of stud 12. In this position spring 14 securely engages rear surface 52 of pane 18. Compressed spring 14 provides a substantially greater area of contact to rear surface 52 than by many other conventional means. Furthermore with hole portion 46 positioned within hole 20 it contacts the side walls thereof so as to provide additional securement of fastener 10 to panel 18. On the front surface 48 of panel 18, washers 16 and 74 are in contact therewith providing a secure water-tight seal.

Figures 12, 13:
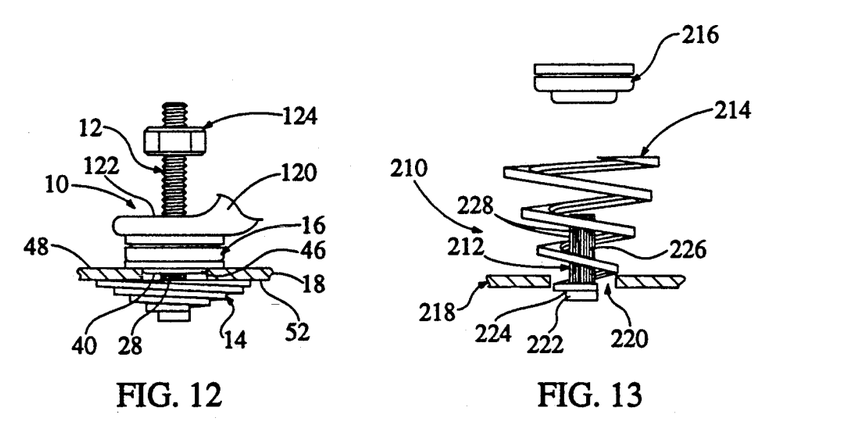
FIG. 12 is a side elevation view of the fastener in the installed position with an article attached thereto.
FIG. 13 is a side elevation view of another exemplary embodiment of the fastener of the present invention.

In the exemplary embodiment illustrated in FIG. 12, fastener 10 contacts three surfaces of panel 18, i.e. front surface 48, the sidewall of hole 20 and rear surface 52. With washer 16 secured upon spline portion 28 by splines 30, fastener 10 in retained in position in hole 20. An article such as a bracket 120 having a mounting hole 122 may be positioned over stud 12 and retained against washer 16 by a threaded washer 124. In the alternative the article to be attached to stud 12 may be threaded and directly coupled to stud 12. Although stud 12 is illustrated as being threaded for securement of the article thereto, other fastening means, such as force fit splines, clench rings or other means well known in the art may be used.

Fastener 10 may be easily removed from panel 18 by means such as prying washer 16 from spline portion 28 while making sure that stud 12 does not slip behind panel 18. Stud 12 is then rotated to remove the remainder of the stud and spring 14 from hole 20. Since the large end of spring 14 is larger in diameter of hole 20, the end of spring 20 need be guided to hole 20. In order to facilitate easy removal of spring 14 it may be formed at the large end a slight inward spiral or radial arm extending back towards the common axis of the spring.

FIG. 13 illustrates a modified version of the fastener of the present invention. In FIG. 13, fastener 210 is constructed in a similar manner to fastener 10 of FIGS. 1–7. However, in replacement of threaded stud 12 of fastener 10, stud 212 is modified as an internally threaded insert. Spring 214 is similarly mounted upon stud 212 as was previously described and illustrated in FIGS. 1–7. Again spring 214 may be of the many previously described various spring configurations.

Stud 212 is comprised of head 222 at one end and shank 226 extending therefrom with shoulder 224 formed where head 222 meets shank 226. Head 222 may be of various shapes or sizes but is again smaller in diameter than hole 220 in panel 218. Head 222 is also larger in diameter than adjacently formed shank 226. Shank 226 is formed with a fastener securing means or a spline portion in a region adjacent to head 222. In the alternative splines 228 may be replaced by clench rings or threads or other well known securing means. Shank 226 includes a central axial threaded internal bore extending a portion of the length from the end opposite head 222 toward head 222.

As illustrated in FIG. 13 the entire length of shank 226 includes a plurality of longitudinal self-cutting force fit splines 228 formed on the outer surface thereof. Splines 228 serve as a means for securing washer 216 upon stud 212 when fastener 210 is installed on panel 218. Although fastener 210 is illustrated in FIG. 13 with splines 228 extending the entire length of shank 226, they need not do so. Although not illustrated, a threaded portion may also be included at an end portion of shank 226 opposite head 222.

Figure 14:
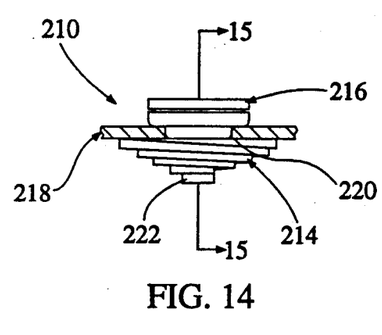
FIG. 14 is a side elevation view of the fastener of FIG. 13 in the installed position.

The installation of fastener 210 is similar in nature to that fastener 10 previously described. In FIG. 14 fastener 210 is completely installed on panel 218 as was illustrated in FIG. 2 for fastener 10. In FIG. 14 washer 216 is similarly mounted to shank 226 with splines 228 retaining washer 216 upon shank 226. In the installed position washer 226 and stud 212 are drawn together such that spring 214 which is retained upon stud 212 by head 222 is again compressed. Spring 214 provides an enlarged contact surface for the rear surface of panel 218. In the installed position washer 216 also provides a contact to the inner wall of hole 220 and the front surface of panel 218.

Figure 15:
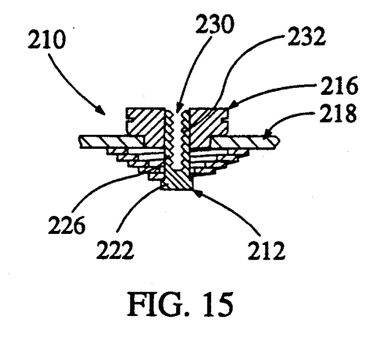
FIG. 15 is a sectional view of the installed fastener of FIG. 14 taken across line 15—15 of FIG. 14.

FIG. 15 illustrates the installed fastener 210 in sectional view taken along line 15—15 of FIG. 14. In FIG. 15 fastener 210 provides further illustration of the nature of stud 212. As mentioned previously stud 212 includes threaded centrally axial bore 230 having internal threads 232 therein. Also as mentioned previously threaded bore 230 extends a portion of the length of shank 226.

Figure 16:
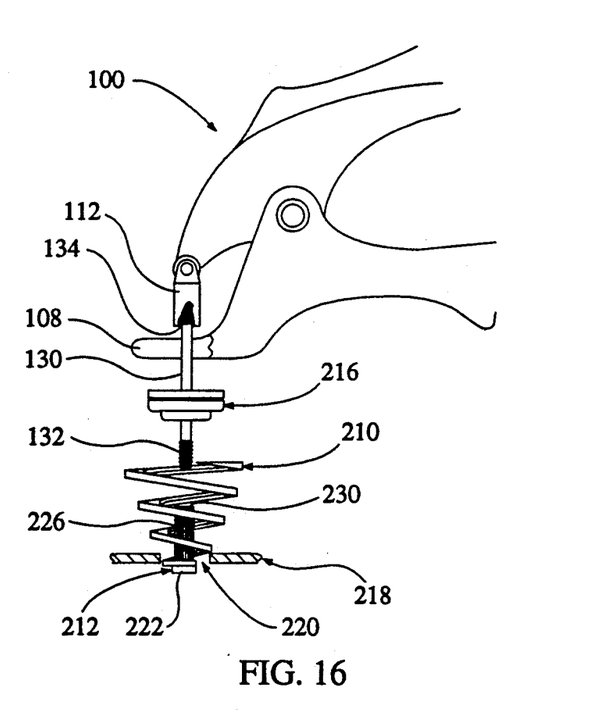
FIG. 16 is a side elevation view of the fastener and installation tool in preparation of installing the fastener to a panel.

FIGS. 16–20 illustrate various stages of installation of fastener 210 of the present invention. In FIG. 16, installation tool 100 is again used for the installation of fastener 210 upon panel 218. Although not illustrated, an optional contact tape type washer may again be used for providing a waterproof seal of fastener 210 in the panel hole 220.

Installation tool 100 includes a attachment accessory 130 for use in installing fastener 210. In the exemplary embodiment accessory 130 is a formed as a rod having threads 132 and 134 formed at respective ends thereof. For purposes of illustration a portion of the end of jaw portion 108 is cut away to illustrate accessory 130 passing through the fork in jaw portion 108.

In FIG. 16, tool 100 is shown with coupling member 112 partially cut away to illustrate the coupling of accessory 130 by threads 134 to the internal threads of coupling member 112. In the installation of fastener 210, the optional washer (not shown) is first placed over the assembly of stud 212 and spring 214, followed by the placement of washer 216 on stud 212. Threads 132 of accessory 130 are then screwed into internal threaded bore 230 of stud 212.

Figure 17:
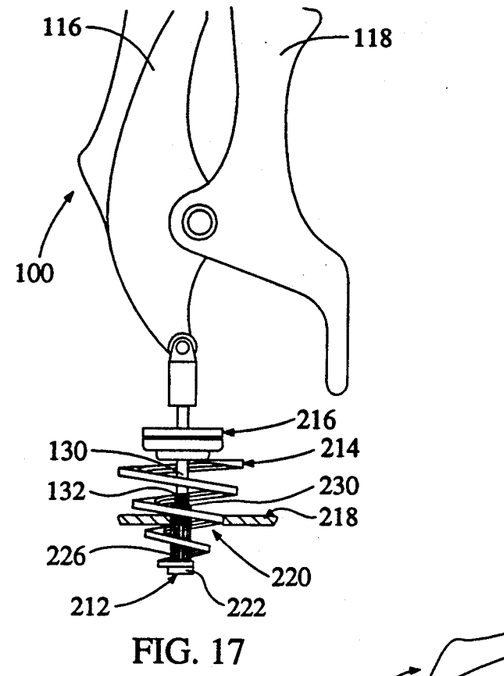
FIG. 17 is a side elevation view of the fastener and installation tool with the fastener partially inserted in the panel.
Figure 18:
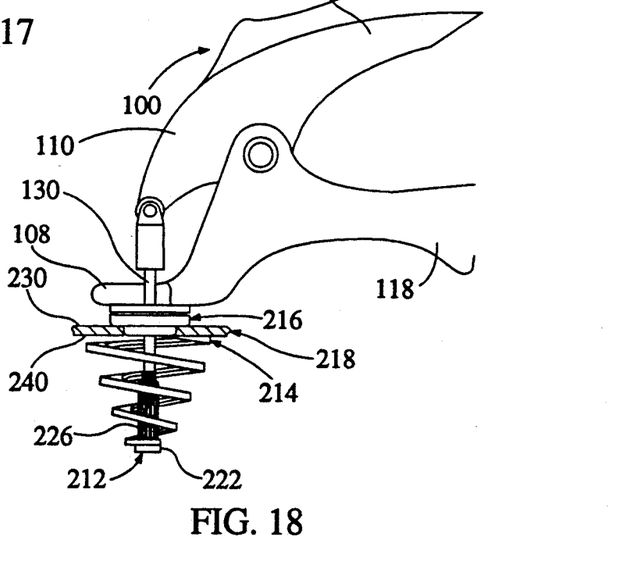
FIG. 18 is a side elevation view of the fastener and installation tool with the fastener fully inserted in the panel.

As illustrated in FIG. 17 fastener 10 is partially inserted in hole 20 using tool 100. Tool 100 is rotated, or by other twisting motion, along with fastener 210 so as to insert fastener 210 through hole 220. FIG. 18 illustrates the complete insertion of fastener 210 within hole 220. In this position spring 214 is completely through hole 220 and contacts rear surface 240 of panel 218. Washer 216 may then be positioned so that its hole potion is within hole 220.

With the forked end of jaw portion 108 positioned directly over and around washer 216, gripping portions 116 and 118 are squeezed together. This action increases the distance between jaw portions 108 and 110 so as to draw accessory 120 and stud 212 through washer 216. At some point washer 216 begins to engage splines 228 of stud 212 and is drawn further thereupon. The closing of gripping portions 116 and 118 draws head 222 closer to panel 218. This action also causes spring 214 to compress as retained between head 222 and rear surface 240 of panel 218.

Figure 19:
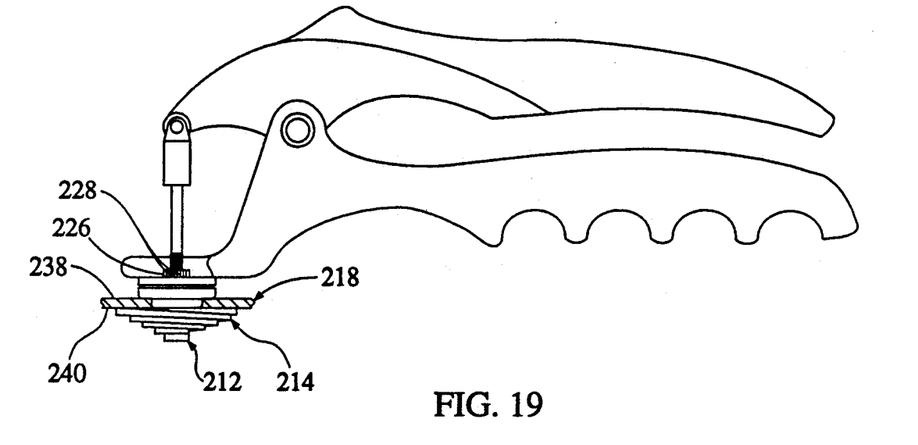
FIG. 19 is a side elevation view of the fastener and installation tool with the fastener installed in the panel.

FIG. 19 illustrates the complete installation of fastener 210 upon panel 218 prior to removal of tool 100. Spring 214 is collapsed with its overlapping coils securely contacting one another and at respective ends to head 22 and rear surface 240 of panel 218. In addition, the hole portion of washer 216 is positioned within hole 20 and the surface portion is compressed against upper front surface 238. Washer 216 is secured upon stud 212 by the engaging action of splines 228 in the washer through hole. The distance to which washer 216 is drawn upon shank 226 of stud 212 is dependent upon the thickness of panel 218. Tool 100 is then removed from stud 212 by simply unscrewing accessory 130 from stud 212.

FIG. 20 again illustrates washer 216 secured upon the splines formed on shank 226. In this position spring 214 securely contacts rear surface 240 of panel 218. Compressed spring 214 provides a substantially greater area of contact to rear surface 52 than by many other conventional means. Furthermore with the hole portion of washer 216 positioned within hole 220 it contacts the side walls thereof so as to provide additional securement of fastener 210 to panel 218. On the front surface 240 of panel 218, washer 216 is in secure contact therewith.

Figure 20:
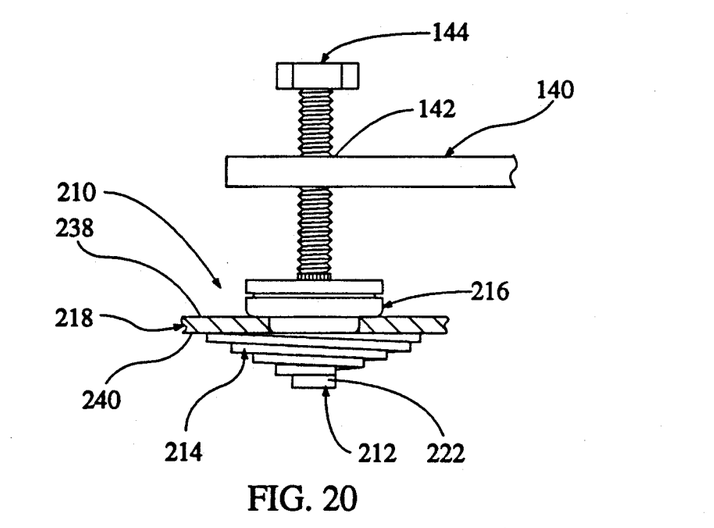
FIG. 20 is a side elevation view of the fastener in the installed position with an article ready for attachment thereto.

In the exemplary embodiment illustrated in FIG. 20, fastener 210 contacts three surfaces of panel 218, i.e. front surface 238, the sidewall of hole 220 and rear surface 240. With washer 216 secured upon shank 226, fastener 210 is retained in position in hole 220. An article such as a bracket 140 having a mounting hole 142 may be positioned over stud 212. Bracket 140 is retained against washer 216 by a threaded bolt 144 which is inserted into the threaded bore in stud 212. As illustrated in FIG. 20, bolt 144 is partially screwed into stud 212. In the alternative the article to be attached to stud 212 may have a threaded stud that is directly screwed into to stud 12. Although stud 212 is illustrated as containing threads within the internal bore, other fastening means, such as additional force fit splines or clench rings or other means well known in the art may be used.

It should be understood that further variations in the exact coupling mechanism between stud 12 and washer 16, or stud 212 and washer 216, may be devised. For example the splines or force fit couplings may be formed on washers 16 and 216 rather than on stud 12 or stud 212.

Figure 21:
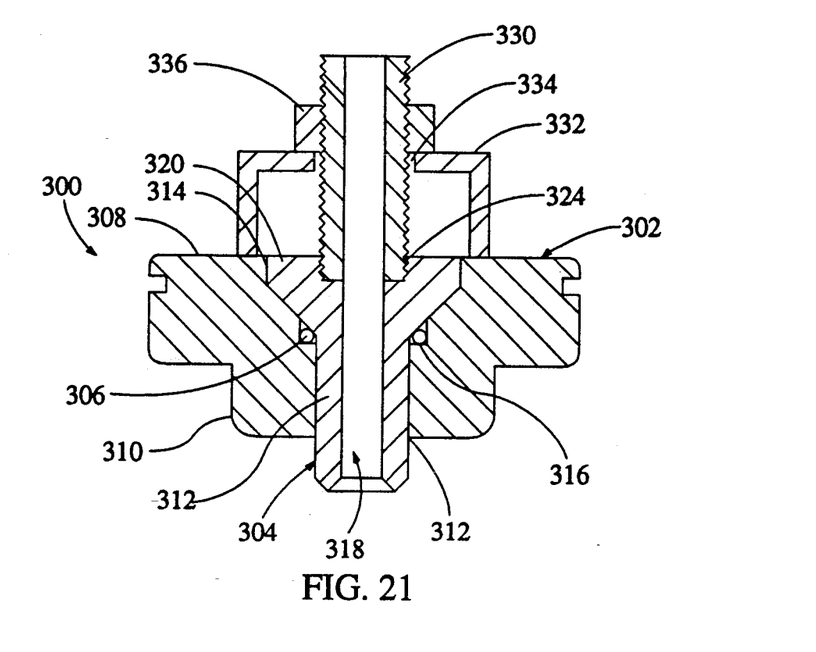
FIG. 21 is a cross sectional view of an alternative configuration for the attachment washer.

Using the fastener of the present invention various size studs or inserts may be used depending upon the load the fastener is to support. In order to reduce the amount of different fastener hardware necessary to support the different load it is desirable to provide some standardized aspects that may be used in all applications. For example in many manufacturing situations it is desirable to use a standard size hole for all fastener installation. FIG. 21 illustrates in a sectional view a modified washer 300 that permits a standard hole size to be used for many different fastener stud or insert sizes as the load demands.

In FIG. 21, washer 300 is comprised of shoulder washer 302, bushing 304 and optional O-ring seal 306. As illustrated washer 302 is of a similar outer configuration as was washer 16 and 216 as described above. Washer 302 as before includes a surface portion 308 and a hole portion 310. Washer 302 includes a central axial through hole 312 which includes at the opening at surface portion 308 a countersunk opening 314. Within washer 302 where the countersink meet the straight portion of through hole 312, an annular ledge 316 may be formed.

Bushing 304 includes a central axial through bore 318, a head portion 320 and a body portion 322. The outer diameter of body portion is of a dimension which permits it to fit within through hole 312 in hole portion 310 and partially into surface portion 308. Head portion 320 is formed with a tapered outer surface so as to fit within countersunk opening 314. Optionally bushing 304 may be retained within through hole 312 by force fit splines formed on either the outer surface of bushing 302 or the inner side wall of through hole 312, or by other well known techniques, if so desired.

In this implementation washer 302 may be of a standard size. Therefore all holes formed in the panel to which the fastener is to be mounted may be of the same size. It is bushing 304 which may include a different diameter through hole 318 depending upon the stud or insert size to be used, while the outer diameter of busing 304 remains the same. The stud or insert splines engage the sidewall of through hole 318 for retaining bushing 304 upon the stud or insert. Bushing 304 when mounted within through hole 312 uses the countersunk opening 314 to capture washer 302 upon bushing 304. A seal may be provided between bushing 304 and washer 302 by the positioning O-ring 306 upon ledge 316.

Also illustrated in FIG. 21 is a portion of an extraction tool which may be used to remove bushing 304 from washer 302. Bushing 304 has an enlarged threaded opening 324 in through bore 318 in head portion 320. Threaded opening 324 is used to engage a threaded extractor 330. A drum spacer 332 is positioned over washer 300 so as to contact washer 302. Spacer 302 includes a central axial through bore 334 through which extractor 330 extends to engage threaded opening 324. Nut 336 is positioned upon threaded extractor 330 and contacts the outer surface of spacer 332. Rotation of extractor 330 and the forced engagement of nut 336 against spacer 334 causes the withdrawal of bushing 304 from washer 302.

Figure 22:
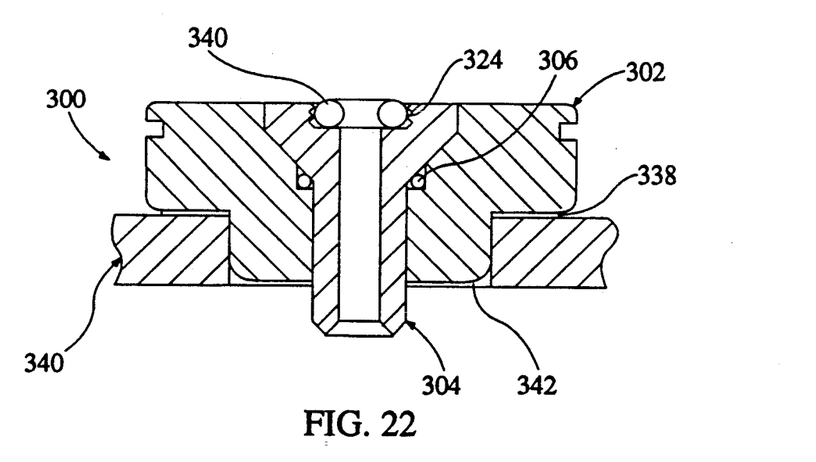
FIG. 22 is another cross sectional view of the washer of FIG. 21.

FIG. 22 illustrates washer 300 mounted in hole 342 in panel 340 with the remainder of the fastener removed for purposes of illustration. As illustrated in FIG. 22 optional sealing washer 338 is mounted between panel 340 and washer 302 about hole 342. Furthermore an additional optional sealing O-ring 340 may be positioned in threaded opening 324. O-ring 340 is of a sufficient cross sectional diameter to provide contact with an article positioned upon the top of washer 300.

Figures 23, 24, 25:
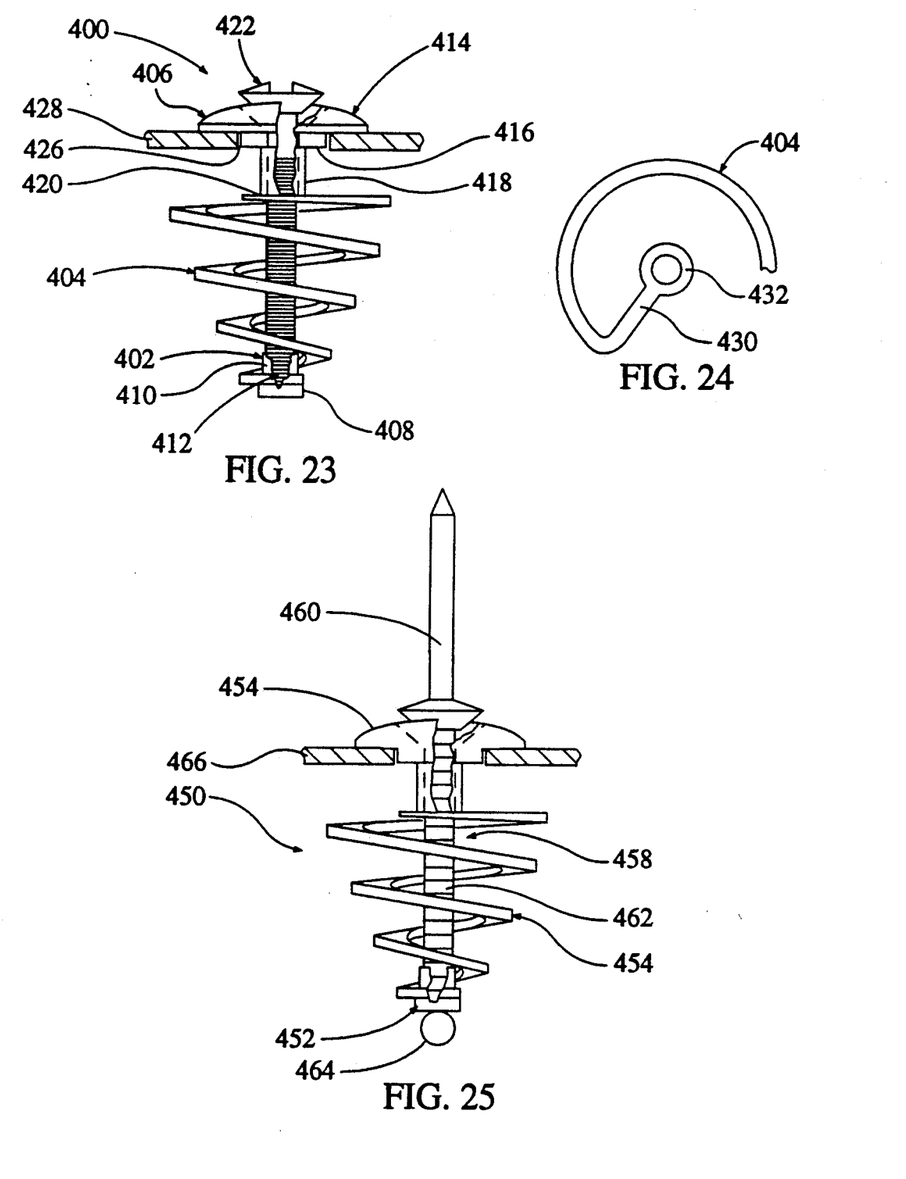
FIG. 23 is a side elevation view with portions partially cut away of an alternative implementation of the fastener of the present invention.
FIG. 24 is a top plan view illustrating a portion of the spring coupled to the surface washer of FIG. 23.
FIG. 25 is a side elevation view with portions partially cut away of an alternative implementation of the fastener of the present invention.

FIG. 23 illustrates an alternative implementation of the fastener of the present invention. In this embodiment no tool is needed to mount the fastener to the panel. In FIG. 23, fastener 400 is illustrated with portions cut away to assist in the understanding of the construction. Fastener 400 is comprised of engagement member 402, spring 404 and washer 406.

Member 402 is constructed with head 408 and shank 410 extending therefrom. A small end of helical spring 404 is mounted upon shank 410 and contacts a shoulder formed where head 408 and a shank 410 meet, with head 408 being of a larger diameter than shank 410. Preferably spring 410 is securely retained on member 402 by the winding of the spring 404 being smaller in diameter than shank 410. In the alternative other well known techniques may to secure spring 404 to member 402. Member 402 may typically have a central axial threaded through bore 412 for engagement with screw 422.

Spring 404 as it extends away from member 402 increases in diameter with the larger end of spring 404 is retained upon washer 406. Washer includes a surface portion 414, a hole portion 416 and a shank 418 formed about a common central axis. Washer 404 includes a central axial through bore 420 which extends through each of portions 414 and 416 along with shank 418. Bore 420 is preferably of a diameter to permit a mounting screw 422 to pass through. Surface portion 414 may include a countersunk opening to receive the head of screw 422 if desired. Positioned within hole 426 of panel 428 is hole portion 416 and extending therefrom opposite surface portion 414 is shank 418.

Spring 404 as it extends away from member 402 increases in diameter with the larger end of spring 404 is retained upon washer 406. As illustrated in further detail in FIG. 24 spring 404 includes at the larger end inwardly extending radial arm 430 which terminates at an integrally formed circular mounting lug 432. Lug 432 has a central located hole which permits spring 404 to be mounted upon shank 418 of washer 406 (FIG. 23). In the alternative lug 432 may be a tightly wound termination of the end of spring 404.

Shank 418 may be slightly flared at the end thereof after positioning of lug 432 thereupon so as to retain spring 404 upon washer 406. In the alternative an annular groove may be formed at the end of shank 418 so as to inhibit spring 404 from moving on shank. As well known in the art other similar techniques may be used.

An article (not shown) to be secured to by fastener 400 to panel 428 may be positioned between fastener 400 and screw 422 as screw 422 is inserted into fastener 400. The tightening of screw 422 in member 402 draws member 402 closer to head 406 thereby compressing spring 404. Spring 404 if not secured at the end of shank 418 may move up on shank 418 and compress against panel 428. In the preferred implementation spring 404 does not move up on shank 418 but the radial arm deflects to permit the end windings of the spring to contact the rear surface of panel 428.

Removal of fastener 400 is easily accomplished by unscrewing screw 422 so as to relieve the compression of spring 404 from panel 428. Screw 422 may be partially or completely removed for the twisting of fastener 400 so as to remove fastener 400 from hole 426. Since a radial arm is provided in spring 404 it may be easily guided out of hole 426.

FIG. 25 illustrates an alternative implementation of the fastener of the present invention similar to that of FIG. 23. In this embodiment a pop rivet-like tool is needed to mount the fastener to the panel. In FIG. 25, fastener 450 is illustrated with portions cut away to assist in the understanding of the construction. Fastener 450 is comprised of engagement member 452, spring 454 and washer 456 in a like manner to the elements of FIG. 23. In fact, fastener 450 may be fabricated to be identical to fastener 400 of FIG. 23.

In installation, fastener 450 is inserted into hole 464 in panel 466. An article (not shown) to be secured to by fastener 450 to panel 466 may be positioned between fastener 450 and pop rivet 458 as pop rivet 458 is inserted into fastener 450. In this embodiment pop rivet 458, of conventional design, extends through washer 456, spring 454 and member 452. As shank 460 of pop rivet 458 is drawn through shaft 462, ball 464 at the end of shank 460 compressibly distorts shaft 462 while pulling member 452 against shaft 462. Due to the possibility of uneven distortion of shaft 462, it may be formed with annular relief grooves to facilitate an even accordion-like distortion. Since a pop rivet is used in this embodiment, removal of fastener 450 is somewhat difficult and is therefore preferred for more permanent applications.

The embodiments of FIGS. 23 and 25 again provide a fastener with improved article load support capabilities by providing a large surface area on the back side of the panel over which the load is distributed.

Figure 26:
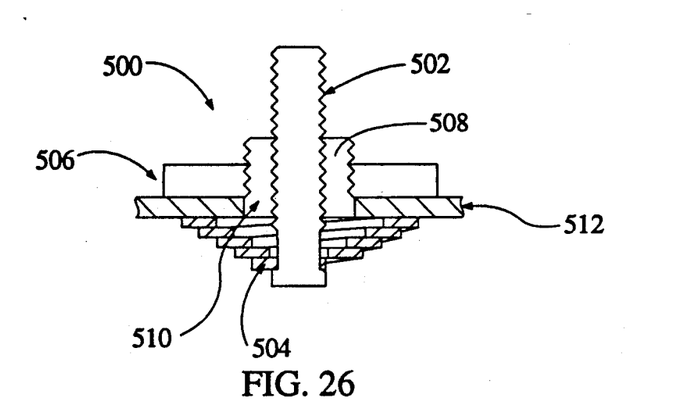
FIG. 26 is a cross sectional view of an alternative implementation of the fastener of the present invention.
Figure 27:
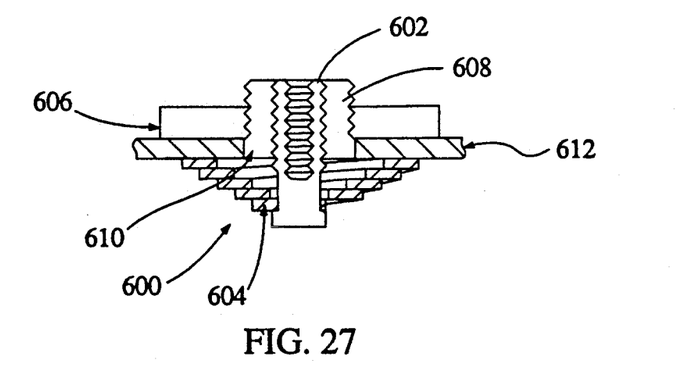
FIG. 27 is a cross sectional view of an alternative implementation of the fastener of the present invention.

FIGS. 26 and 27 illustrate in sectional view several other modifications that may be made to the basic fastener of the present invention. In FIG. 26 fastener 500 is constructed with stud 502 and spring 504 constructed in a similar manner to that of fastener 10 of FIG. 1. Washer 506 is constructed as a flat surface washer which includes central bushing 508. Bushing 508 extends from washer 506 into hole 510 in panel 512. Bushing 508 may be threadably coupled to washer 506 and stud 502, or by other means well known in the art such as by force fit splines. For fastener 500, a common size washer may be used for different diameter through hole bushings. By changing bushings for corresponding different diameter studs a common washer and panel hole size may be used.

In FIG. 27 fastener 600 is constructed with stud 602 and spring 604 constructed in a similar manner to that of fastener 210 of FIG. 13. Washer 606 is constructed as a flat surface washer which included central bushing 608. Bushing 608 extends from washer 606 into hole 610 in panel 612. Bushing 608 may be threadably coupled to washer 606, or by other means well known in the art such as by force fit splines. As was for fastener 500, fastener 600 also uses a common size washer which may be used for different diameter through hole bushings. By changing bushings for corresponding different diameter studs a common washer and panel hole size may be used.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A fastener comprising:
   a stud having a head and a shank, said shank having a plurality of force fit splines formed longitudinally along an outer surface thereof;
   a spring mounted upon, said spring adjacent said head and encircling said shank for engaging a panel surface and exerting a force thereon; and
   a washer having a through hole, said washer mounted upon said shank within said through hole and forcibly engaging said splines thereat for retention upon said shank; and
   retaining means formed upon said shank for engaging an article for securement thereto.

2. The fastener of claim 1 wherein said spring is of a helical shape with overlapping windings, said spring having at one end a large opening and at another end a small opening smaller in diameter than said head, and wherein said spring is mounted upon said stud with said spring small opening facing said head.

3. The fastener of claim 1 wherein said retaining means comprises threads formed upon an outer surface of said shank adjacent an end opposite said head.

4. The fastener of claim 1 wherein said shank has an internal bore extending a portion of a length thereof from an end opposite said head and wherein said retaining means comprises threads formed within said bore.

5. The fastener of claim 1 wherein said washer has a hole portion and a surface portion, said hole portion of a smaller diameter than said surface portion so as to form a shoulder.

6. The fastener of claim 5 wherein said washer further comprises a bushing mounted within said washer hole, said bushing having a through bore for securely engaging said shank with said first retaining means.

7. The apparatus of claim 6 wherein said shank of said stud is threaded.

8. The apparatus of claim 6 wherein said shank of said stud has an internal threaded bore.

9. The apparatus of claim 7 wherein said shank of said stud has an internal threaded bore.

10. An apparatus for enabling the attachment of an article to a substrate having front and rear surfaces and an aperture formed therebetween, comprising:
   a stud for extending through said aperture and coupling to an article having a head at one end and a shank extending therefrom, said shank having a first engagement portion formed adjacent said head and a second engagement portion formed internal to said stud at an other end of said shank opposite said shank one end;
   first retaining means captured upon said stud for securably engaging said substrate rear surface; and
   second retaining means for securably coupling to said mounting means and for securably engaging said substrate front surface comprising a washer having an internal through bore and a bushing having an internal through bore said bushing mounted within said washer through bore and wherein said bushing through bore is in frictional contact with said mounting means.

11. An apparatus for enabling the attachment of an article to a substrate having front and rear surfaces and an aperture formed therebetween, comprising:
   mounting means for extending through said aperture and coupling to an article;
   a collapsible helical spring captured upon said mounting means for securably engaging said substrate rear surface having overlapping winding and a small end engaged by said mounting means and a large end for engaging said substrate rear surface; and
   second retaining means for securably coupling to said mounting means and for securably engaging said substrate front surface comprising a washer having an internal through bore and a bushing having an internal through bore said bushing mounted within said washer through bore and wherein said bushing through bore is in frictional contact with said mounting means.

12. A fastening system comprising:
   a stud having a head and a shank, said shank having a plurality of force fit splines formed longitudinally along an outer surface thereof;
   a spring mounted upon, said spring adjacent said head and encircling said shank for engaging a panel surface and exerting a force thereon;
   a washer having a through hole, said washer mounted upon said shank within said through hole and forcibly engaging said splines thereat for retention upon said shank;
   retaining means formed upon said shank for engaging an article for securement thereto; and
   a fastening tool for removably coupling to said shank of said stud and for pulling said head of said stud toward said washer.

13. The apparatus of claim 12 wherein said shank of said stud is threaded.

14. The apparatus of claim 13 wherein said fastening tool further comprises an internal bore for removably coupling to said threaded shank of said stud.

* * * * *